United States Patent [19]
Schrack et al.

[11] 3,776,369
[45] Dec. 4, 1973

[54] AUTOMATIC/MANUAL LUBRICATION SYSTEM FOR POWER TOOLS

[76] Inventors: Frank C. Schrack, 6388 Elm; Arthur Lee, 694 Beachview Dr., both of Vancouver, British Columbia, Canada

[22] Filed: Apr. 17, 1972

[21] Appl. No.: 244,633

[30] Foreign Application Priority Data
Apr. 15, 1971   Canada.............................. 110399

[52] U.S. Cl............. 184/15 R, 83/169, 123/196 CP, 184/28
[51] Int. Cl........................... F16n 13/08, F01m 1/04
[58] Field of Search...................... 184/28, 38, 15 R, 184/15 A; 83/169; 123/196 R, 196 CP

[56] References Cited
UNITED STATES PATENTS
2,944,538   7/1960   Conway et al. ................... 184/15 R
3,332,411   7/1967   Bloom et al. ..................... 184/28 X
3,010,538   11/1961   Strunk.............................. 184/15 R FOREIGN PATENTS OR APPLICATIONS
1,154,925   9/1963   Germany........................... 184/15 R

*Primary Examiner*—Manuel A. Antonakas
*Attorney*—McDougall, Hersh & Scott

[57] ABSTRACT

The internal combustion engine of a portable chain saw includes a liquid lubricant reservoir which is in being pressurized thereby. A cylindrical subassembly is mounted in this reservoir and includes a spring-biased ball valve adjacent an inlet opening, which opening is normally immersed in the liquid lubricant. This subassembly includes an outlet communicating with a passageway to the cutting chain to be lubricated. When the internal combustion engine is running, the pressurized lubricant unseats the ball valve thereby automatically lubricating the cutting chain by a metered flow of lubricant past the ball valve. The cylindrical subassembly includes a piston pump which is manually actuated from a lever adjacent the control quadrant of the portable tool. Each actuation of this lever causes the ball to be unseated and a quantity of the liquid lubricant to be supplied to the cutting chain for manual lubrication before starting the internal combustion engine; when the engine is running, operation of this lever increases the flow of oil to the cutting chain.

10 Claims, 11 Drawing Figures

PATENTED DEC 4 1973 3,776,369

PATENTED DEC 4 1973 3,776,369

AUTOMATIC/MANUAL LUBRICATION SYSTEM FOR POWER TOOLS

BACKGROUND OF THE INVENTION

The field of the invention relates to lubrication systems for portable power tools. More particularly, the invention relates to a lubrication system for oiling the cutting chain of a portable chain saw, which system includes means for automatically supplying a flow of oil to the chain during operation of the saw, for manually supplementing this flow of oil during engine operation, and for manually supplying a flow of oil to the chain before starting of the engine.

It is known in the art to provide both an automatic and a manual oiling system for a chain saw of the type powered by an internal combustion engine. In such prior art systems known to the applicants herein, an oil-containing reservoir is in communication with the cylinder of a manually operated pump through a first passageway. This cylinder is in communication with the cutting chain to be lubricated through a second passageway for manual oiling of such moving parts when the aforementioned piston is manually operated. The oil reservoir is in communication with a separate cylinder through a third passageway. The piston in this cylinder is actuated by a diaphragm which in turn is actuated by crankcase pressure. This last mentioned cylinder joins the aforementioned second passageway by means of a fourth passageway.

This prior art system has several disadvantages. It requires two separate pistons or pumps to provide manual and automatic flow. Such prior art system presents some problems from the manufacturing standpoint in view of the necessity of providing the plural passageways referred to above. Also, this prior art system requires the use of several one-way check valves because of the separate subsystems constituted by the manually operated pump and the automatically operated pump.

OBJECTS OF THE INVENTION

It is a primary object of the present invention to provide a new and improved automatic/manual lubrication system for a power tool.

It is another object of the present invention to provide a new and improved automatic/manual lubrication system for a power tool, such as a portable chain saw with an internal combustion engine, wherein single valve means are provided in the passageway between the lubrication reservoir and the parts to be lubricated, such valve being opened by a manually operated level as desired and being automatically opened during operation of the tool.

Still another object of the present invention is the provision of an automatic/manual lubrication system of the type described, wherein a piston, when stationary, provides for the metered flow of oil during automatic operation of the lubrication system and wherein such piston, when reciprocated by manually operated means, provides for oiling of the moving parts when the power tool is not running and for increasing the flow of oil when the tool is running.

Another object of the present invention is the provision of an automatic/manual lubricating system for a power tool wherein a single valve is provided in the passageway between the lubricant reservoir and the parts to be lubricated and wherein such valve is the only valve actuated in both the automatic and manual modes of operation.

Still another object of the present invention is the provision of a new and improved automatic/manual lubrication system of the type described, wherein such system consists primarily of a cylindrical subassembly unit which is of simplified construction in itself and which may be readily installed in the frame or housing of the power tool.

These and other objects and advantages of the invention will become apparent from the following specification disclosing a preferred embodiment shown in the accompanying drawings.

DESCRIPTION OF THE PREFERRED EMBODIMENT

Figure 1:
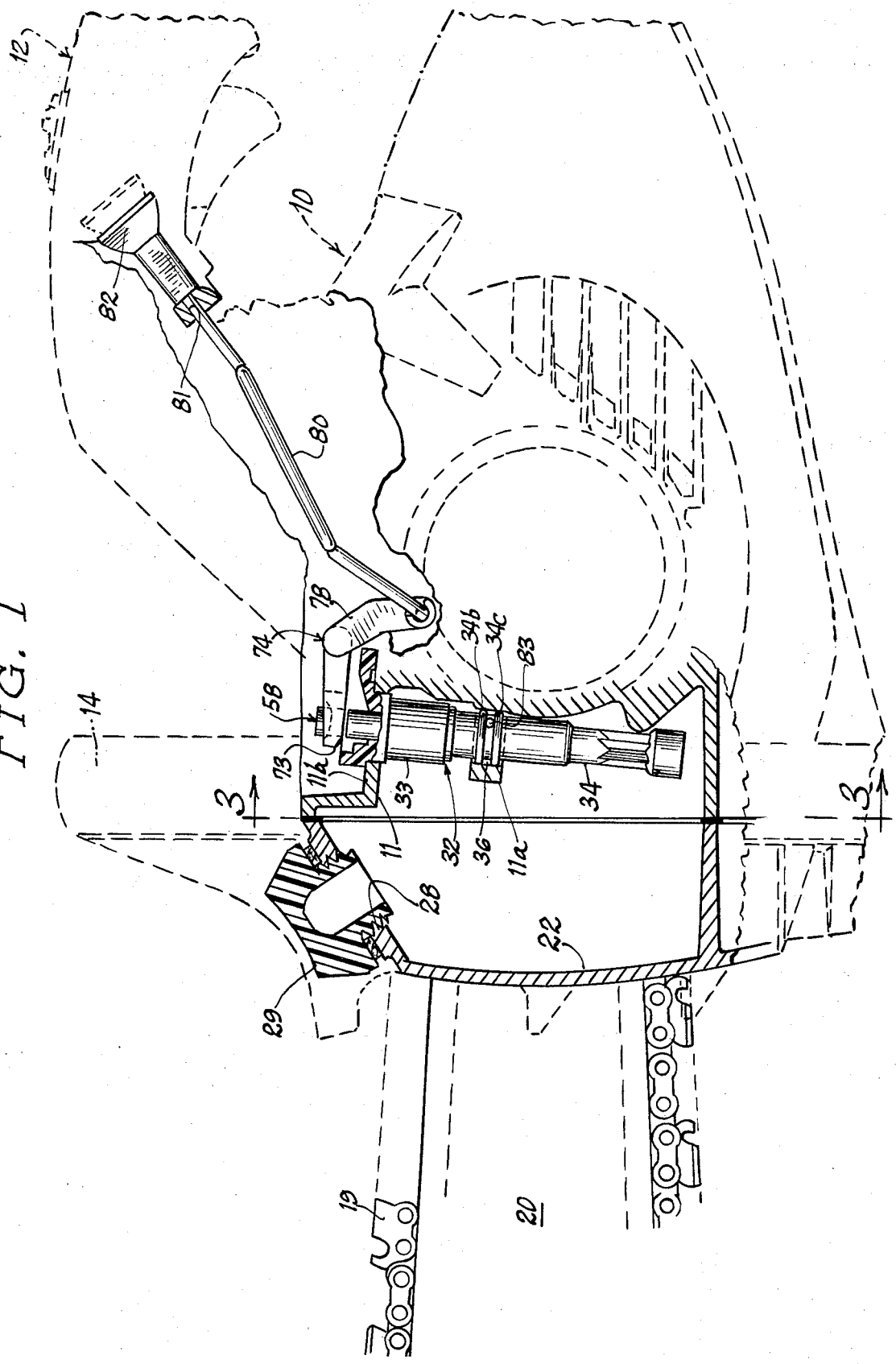
FIG. 1 is a fragmentary side elevation of a portable chain saw embodying the present invention, with certain parts of the chain saw being broken away and other parts being shown by phantom lines.
Figure 2:
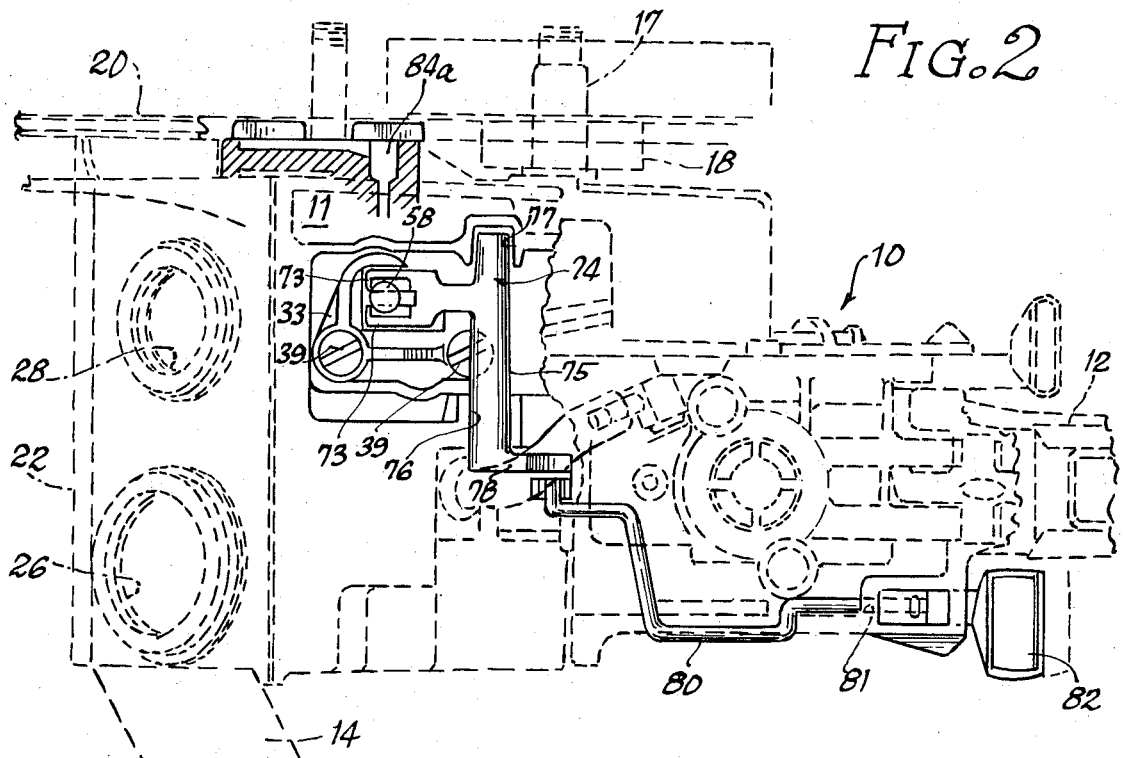
FIG. 2 is a fragmentary top plan view of the portable chain saw embodying the present invention, with certain parts being broken away and other parts being shown by phantom lines.
Figure 6:
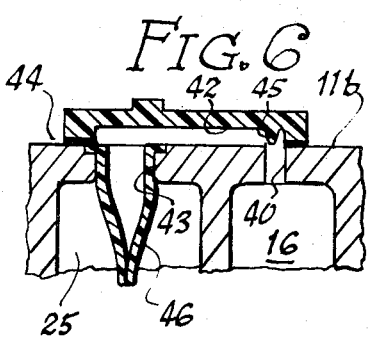
FIG. 6 is a section taken along the line 6—6 of FIG. 5 and showing a fragmentary portion of the adjacent frame or housing of the power tool.
Figure 5:
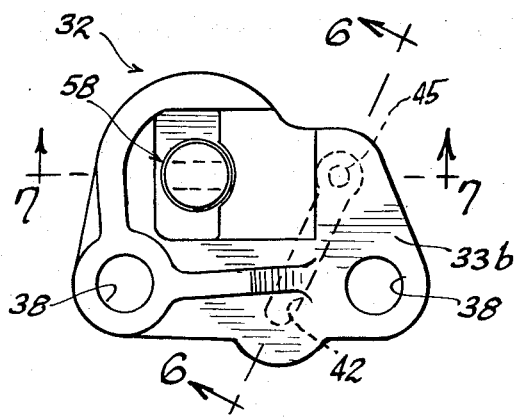
FIG. 5 is an enlarged top view of the cylindrical subassembly forming a part of the lubricating system, showing such subassembly oriented in the position it occupies in FIG. 2.
Figure 8:
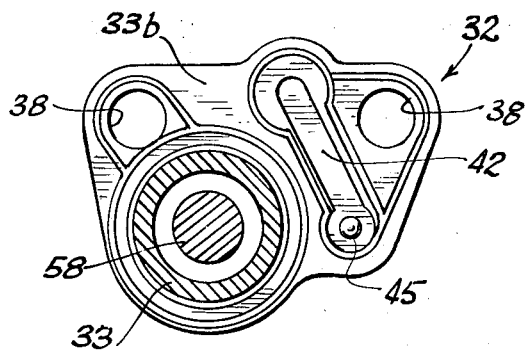
FIG. 8 is a section taken along the line 8—8 of FIG. 7.

The present invention has particular, although not exclusive, application in a gasoline engine powered chain saw so as to provide both automatic and manual oiling of the cutting chain. Referring primarily to FIGS. 1 and 2, a typical chain saw in which the present invention may be embodied is seen to include a housing, generally designated 10, which is defined in part by a casting or frame 11. The housing includes a rearwardly extending handle 12 and a transversely disposed handle 14 permitting a single operator to manipulate the chain saw as desired. It will be understood that the power saw includes a gasoline operated internal combustion engine including the usual crankcase, a portion of which is shown in FIG. 6 and designated 16. As is known to those skilled in the art, the pressure in such crankcase rises to a level about atmospheric pressure during operation of the internal combustion engine.

The internal combustion engine drives a shaft 17 mounting a sprocket 18 for driving the cutting chain 19, the latter being trained around the periphery of a guide bar or blade 20. A shell or subhousing member 22 is secured to the casting or frame 11 and includes a partition which cooperates with the partition 23 (FIG. 3) on the casting 11 to define a fuel compartment 24 and another compartment or reservoir 25, the latter being adapted to contain a supply of liquid lubricant, such as a suitable oil. The fuel compartment includes an access opening 26 for receiving a supply of gasoline which is fed to the internal combustion engine through an inlet pipe 27. The oil reservoir 25 includes an access opening 28 which is normally closed by a cap 29. A similar cap (not shown) is provided for closing the fuel access opening 26.

It is believed that the foregoing description of a typical chain saw, which of itself forms no part of the present invention, is sufficient for a complete understanding of the present invention to be described hereinbelow. The present invention is of course not to be limited for use in the particular chain saw just described, or in any particular power tool for that matter, as the invention has utility in other power tools which require both automatic and manually operated systems for lubricating the moving parts of such power tools.

Figure 4:
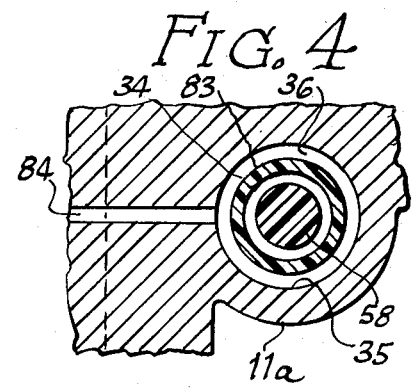
FIG. 4 is an enlarged section taken along the line 4—4 of FIG. 3.

The present invention consists primarily of a cylindrical subassembly, generally designated 32, which is preferably made of a plastic material and which principally consists of two generally cylindrical members 33 and 34. The member 34 includes an annular formation 34a on its upper end which is yieldably received in an annular recess 33a of the member 33 thereby permitting these two cylindrical members to be snapped into engagement with each other during the assembly process. The cylindrical member 34 includes annular ribs 34b, 34c which are snugly received within an annular opening 35 (FIG. 4) formed in a frame or casting portion 11a of the housing of the chain saw. These ribs cooperate with the opening 35 to define an annular chamber 36 which will be referred to again hereinbelow.

The cylindrical member 33 includes an integral, generally planar flange portion 33b having a pair of apertures 38 for receiving screws 39, the latter being received in suitable threaded bores in the casting 11. It should be apparent that the subassembly 32 may be quickly and easily mounted in place in the housing of the power tool, the former being securely held in place by means of its snug reception in the bore 35 and by means of the two fasteners 39.

As noted in FIG. 6, the portion of the casting 11 which defines the crankcase 16 includes a small opening 40 which opens into one end of an elongated channel 42 which is formed in the portion 33b of the cylindrical member 33. This channel cooperates with a surface 11b of the casting 11 to define a passageway communicating the opening 40 with another opening 43, which last mentioned opening is formed in the casting 11 and communicates with the oil reservoir 25. Preferably, a gasket 44 forms a seal between the casting surface 11b and the underside of the planar extension 33b of the cylindrical member 33. The planar portion 33b includes an integral, depending projection 45, the lower tip of which partially extends into the opening 40 for aiding in the proper orientation of the cylindrical member 33 with respect to the casting 11. A yieldable duckbill valve 46, which of itself is known to those skilled in the art, is secured in the opening 43 and extends into the oil reservoir 25. When the internal combustion engine is operated, fluid pressure causes the duckbill valve 46 to be opened for pressurizing the liquid lubricant in the reservoir 25. Of course, the duckbill valve permits fluid flow in one direction only.

Figure 11:
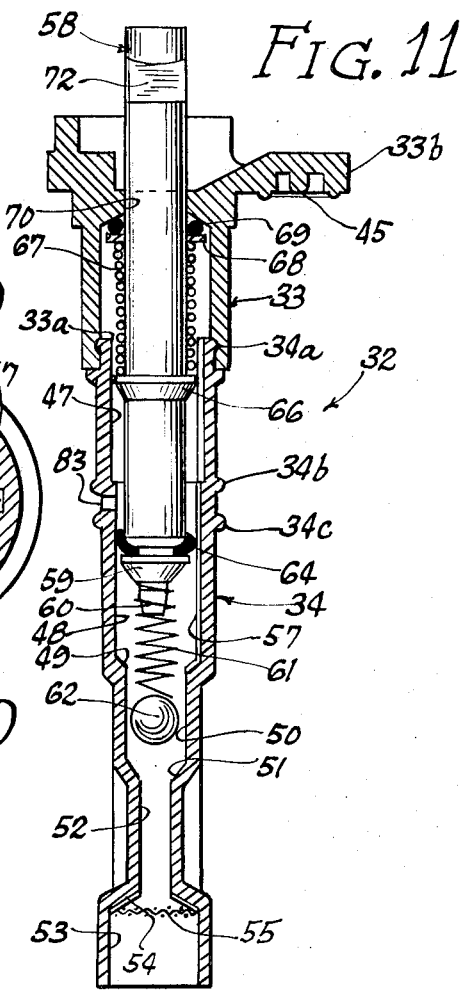
FIG. 11 is a section similar to FIG. 7 but showing the piston in its uppermost position in response to actuation of the manual oiling control.

The cylindrical member 34 includes a longitudinally extending bore defined by a first portion 47 joining with a reduced-in-diameter portion 48. The bore portion 48 joins with a frusto-conical bore portion 49, the latter defining an annular valve seat. The valve seat 49 joins one end of a cylindrical bore portion 50, the other end of such bore portion joining with a frusto-conical formation 51 defining a continuous annular valve seat. This valve seat portion joins with another cylindrical bore portion 52, which portion is joined to an enlarged bore portion 53 by means of a frusto-conical portion 54. The bore portion 53 defines the inlet of the subassembly 32 and is preferably provided with a screen 55 to prevent the introduction or foreign material into the subassembly. The inlet or lower end of the subassembly 32 is normally immersed in the liquid lubricant contained in the reservoir 25. At this time it should be noted that the bore portions 47, 48 include a longitudinally extending groove 57; this groove extends to the valve seat defined by the surface 49 and interrupts the latter as best seen in FIG. 11.

Figure 7:
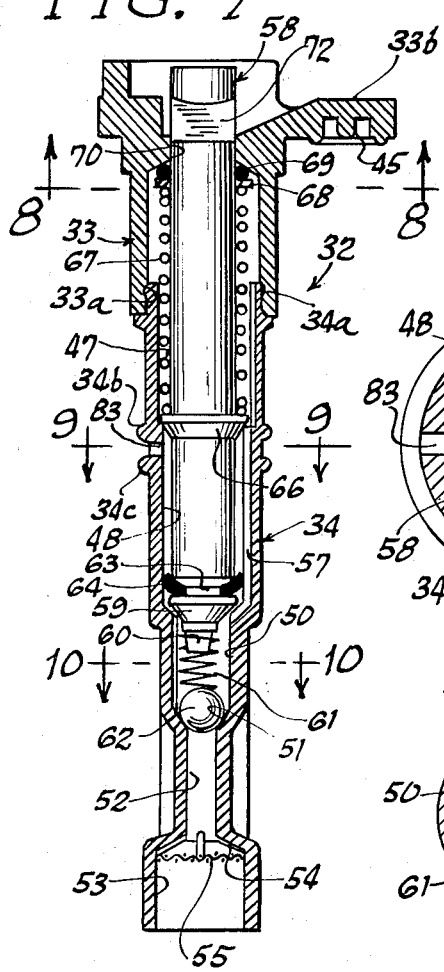
FIG. 7 is a section taken along the line 7—7 of FIG. 5.
Figure 9:
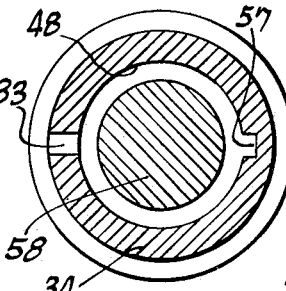
FIG. 9 is an enlarged section taken along the line 9—9 of FIG. 7.
Figure 10:
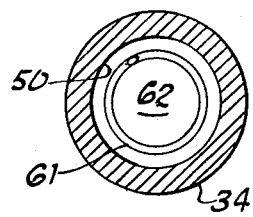
FIG. 10 is an enlarged section taken along the line 10—10 of FIG. 7.

A cylindrical member, generally designated 58, is mounted for reciprocal movement in the longitudinally extending bore defined by the members 33, 34. One end of the member 58 is defined by a frusto-conical formation 59 which is adapted for sealing engagement with the valve seat surface 49, except for the area of the latter which is interrupted by the longitudinally extending groove 57. When the formation 59 is in engagement with this valve seat as shown in FIG. 7, the formation 59 cooperates with the groove 57 to define a metering orifice for the oil during automatic operation of the system as will be explained hereinbelow.

Adjacent the formation 59 is a centrally disposed projection 60 received in one end of a coil spring 61, the other end of such coil spring engaging a ball valve 62 for yieldably holding the latter in sealing engagement with the continuous annular valve seat defined by the frusto-conical surface 51. An annular recess 63 is formed in the member 58 adjacent the formation 59, which recess receives a yieldable annular member 64 which is in sealing engagement with the bore portion 48 except for the area of the latter defining the groove 57. The formation 59 and the member 64 may be considered as a piston forming part of a manually operated pump to provide the manual mode of operation as will be explained herein.

The cylindrical member 58 includes an intermediate frusto-conical formation 66 which is disposed adjacent the juncture of the bore portions 47, 48 when the member 58 is in its lowermost position with the formation 59 in engagement with the valve seat constituted by the formation 49. One end of a coil spring 67 abuts the upper surface of the formation 66; the other end of this spring abuts a washer 68, which washer adjoins an O-ring 69, the latter forming a seal between the member 58 and an opening 70 in the cylindrical member 33. It will be apparent that the spring 67 acts to urge the member 58 to its lowermost position and to hold the O-ring 69 in snug sealing engagement with the member 58 thereby to prevent the leakage of oil from the upper end of the subassembly 32.

The upper portion or stem of the member 58 includes a pair of oppositely disposed recesses or notches 72 which receive tines 73 integrally formed on a rocker member, generally designated 74, the latter being best seen in FIGS. 1 and 2. This rocker member includes a shaft portion 75, opposite ends of which are received in journal-like formations 76, 77, the latter being formed in the frame or casting 11. It will be understood that during assembly, the rocker may be merely dropped into place and is thereby mounted for rocking or limited swinging movement about the longitudinal central axis of the portion 75.

The rocker includes an integral arm 78, the distal end of which is pivotally connected to one end of a bent rod 80. The other end of this rod passes through a suitable guide opening 81 which is formed in the casting 11, this end of the rod mounting a manual oiler knob 82. As best noted in FIGS. 1 and 2, this knob is mounted adjacent the rearwardly extending handle 12 for convenient operation by the operator's hand engaging such handle. It should be apparent that when the knob 82 is pushed from its broken line position to its solid line position shown in FIG. 1, the cylindrical member 58 will be raised from the position shown in FIG. 7 to the position shown in FIG. 11. When this knob is released, the spring 67 will act to force the member 58 downwardly and thereby return the knob 82 to its inoperative position.

The cylindrical member 34 includes a port 83 between the ribs 34b, 34c; this port communicates the interior of the subassembly 32 with the annular chamber 36. The casting 11 includes a bore or passageway 84 communicating with the annular chamber 36. This passageway communicates with an opening 85 which extends part through the guide bar 20 for the cutting chain. This last mentioned opening communicates with a groove 86 extending in a continuous manner around the guide 20 for receiving projections (not shown) on the cutting chain links to guide the same around the periphery of the guide bar. The groove 86 receives the lubricating oil and causes the latter to be distributed along the entire length of the cutting chain for proper lubrication of the latter. As noted in FIG. 3, the passageway 84 includes an enlarged portion 84a to maintain communication between this passageway and the opening 85 during adjustment of the guide bar 20 relative to the housing 10 of the chain saw.

Figure 3:
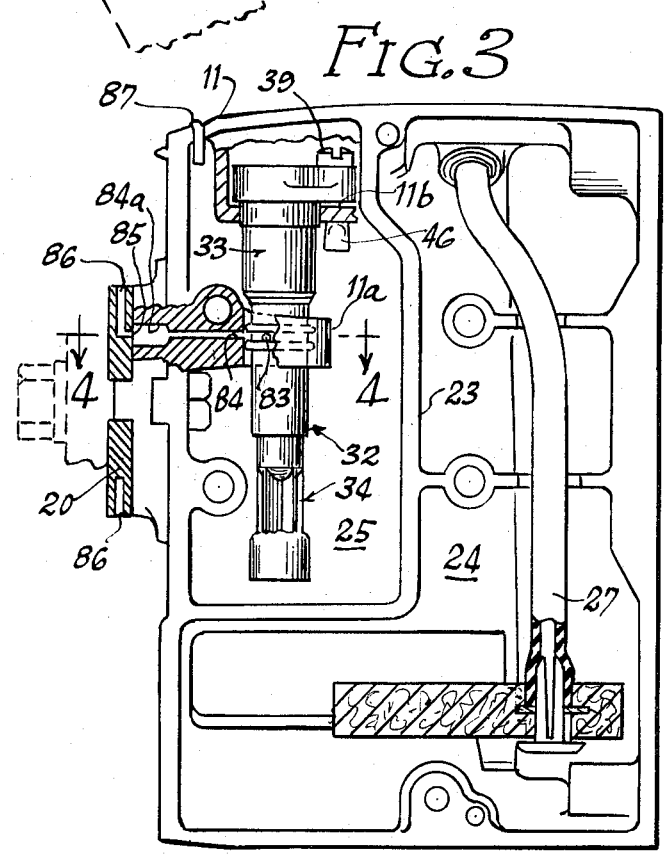
FIG. 3 is a section taken along the line 3—3 of FIG. 1, with certain parts being broken away for better illustration of the invention.

Referring to FIG. 3, a vent-valve 87 extends into the reservoir 25 through a suitable aperture in the casting 11. This valve provides a slow vent to atmosphere, i.e., it permits the reservoir 25 to be pressurized to a suitable level by crankcase pressure and, after the internal combustion engine is shut down, it permits the pressure in reservoir 25 to bleed to atmosphere thereby to return the reservoir 25 to atmospheric pressure. This valve will permit unseating of the ball 62 after the engine is shut down due to residual pressure in the reservoir 25.

As is known to those skilled in the art, it is desirable to provide a cutting chain with a supply of oil prior to powered operation of the chain. This may be achieved according to the present invention by operating the manual oiling knob 82 one or more times as desired. When the member 58 is lifted by depressing the knob 82, the biasing effect of the spring 61 on the ball 62 is released and the upward movement of the piston member 64 forms a vacuum for drawing the oil past the ball 62 and along the groove 57. The cross-sectional area of this groove is small as compared to the effective area of the piston constituted by the surface 59 and member 64 such that upward movement of this piston will produce an adequate vacuum to draw the oil into the groove 57. When the knob 82 is released and the spring 67 allowed to force the member 64 downwardly, oil trapped between the ball 62 and the member 64 is forced through the groove 57.

Thus, each in and out actuation of the knob 82 provides two applications of oil to the cutting chain. The oil enters the annular space defined by the member 58 and the bore portions 47, 48. The oil passes through the port 83 and into the annular chamber 36. The oil then flows through the passageway 84 and enters the groove 86 in the guide bar 20 for lubricating the cutting chain. If the bore in the members 33, 34 and the passageway extending to the guide bar 20 are not filled with oil as a result of previous operation of the power tool, it may require repeated operation of the knob 82 to advance the oil to the cutting chain.

During the operation of the internal combustion engine, the reservoir is pressurized by crankcase pressure thereby resulting in lifting of the ball 62 from the valve seat defined by the surface 51. The oil passes through the metering orifice defined by the groove 57 and the piston formation 59 and enters the annular space defined by the members 34, 35 and the cylindrical member 58. The oil is forced through the port 83 wherein it enters the annular chamber 36 and then passes to the groove 86 in the guide bar 20 by means of the passageway 84. Thus, the cutting chain is automatically oiled or lubricated by a metered amount of oil during the operation of the internal combustion engine. At this time, it should be mentioned that the metering orifice may be formed by means other than the groove 57. For example, such orifice might be defined by the piston formation 59 and member 64.

If the knob 82 is actuated during powered operation of the chain saw, an additional quantity of oil will be supplied to the cutting chain. This is an important feature as during certain cutting operations it is desirable to provide the cutting chain with a greater supply of oil than that provided by the automatic lubrication system. When the knob 82 is depressed during the operation of the internal combustion engine, the member 58 will be lifted again releasing the biasing effect of the spring 61. Of course, the ball 62 will already be unseated from the valve seat 51 due to pressurization of the oil reservoir. The upward movement of the member 58 causes corresponding movement of the sealing member 64 thereby resulting in an increased supply of oil through the port 83 and the passageway 84 extending to the guide bar. When the knob 82 is released, the spring 64 forces the member 58 and sealing member 64 downwardly thereby to immerse the pressure of the oil between the member 64 and the ball 62 for forcing the oil along the groove 57 at a rate greater than that provided during automatic operation.

It should be apparent that the present invention provides a lubrication system of simplified construction and capable of both the automatic and manual modes of operation. Only a single passageway extends between the oil reservoir and the cutting chain and only a single valve constituted by the ball 62 need be provided in this passageway.

We claim:

1. Means for lubricating the moving parts of a power tool having a compartment which is pressurized upon starting of the tool, said lubricating means comprising:
   a. a closed reservoir on the power tool, which reservoir is adapted to contain a supply of liquid lubricant;
   b. first passageway means connecting said compartment with said reservoir for pressurizing the latter upon starting of the power tool;
   c. second passageway means connecting said reservoir with said moving parts, said second passageway means including a cylindrical bore having an inlet opening into said reservoir and an outlet opening to a passageway which extends to said moving parts, said bore defining a continuous annular valve seat which is between said inlet and said outlet and which faces the latter, said bore having a portion between said valve seat and said outlet;
   d. valve means in said second passageway means operable solely in response to a pressure differential across the same, said valve means including a ball in said bore and adapted for sealing engagement with said valve seat;
   e. manually operated elements on the power tool including pump means in said second passageway means and downstream of said valve means for opening said valve means and causing a flow of lubricant through said second passageway means in response to each manual actuation of said elements when said power tool is not running and said reservoir is thereby unpressurized and for supplementing the flow of lubricant during the automatic lubrication of said moving parts when said power tool is running and said reservoir is thereby pressurized, said pump means including piston means reciprocally mounted in said portion of said bore and cooperating with the latter to define an orifice for the metered flow of lubricant past said piston means; and
   f. biasing means engaging said valve means for urging the latter closed, which biasing means permit said valve means to be opened by the lubricant in said reservoir upon pressurizing of the latter thereby automatically lubricating said moving parts upon starting of the power tool, said biasing means being interposed between said ball and said piston means.

2. The lubricating means according to claim 1 whereby said bore portion includes a longitudinally extending groove in the wall thereof, said piston means being in sealing engagement with the wall of said bore portion except for the area of the latter defining said groove thereby to define said orifice for the metered flow of lubricant past said piston means.

3. The lubricating means according to claim 1 further defined by:
   a. stem means having one end thereof connected to said piston means and having the other end thereof disposed exteriorly of said bore;
   b. other biasing means on said stem means for urging said piston means toward said ball; and
   c. said manually operated elements including a hand actuated member connected to said stem means for moving said piston means away from said ball in response to manual actuation of said member.

4. The lubricating means according to claim 1 further defined by:
   a. said bore including another annular valve seat which is between said first mentioned valve seat and said outlet and which faces the latter, said another valve seat being interrupted by the end of said groove which is adjacent said first mentioned valve seat; and
   b. said piston means including a surface adapted for sealing engagement with said another valve seat thereby establishing the innermost limit of movement of said piston means, said surface and said groove defining said metering orifice for the liquid lubricant when said surface is in engagement with said another valve seat.

5. The lubricating means according to claim 4 wherein said piston means further includes a yieldable annular member adjacent said surface and adapted for sealing engagement with the wall of said bore portion except the area of the latter defining said groove.

6. The lubricating means according to claim 1 wherein said power tool is a portable chain saw operated by an internal combustion engine, wherein said moving parts are defined by the links of the cutting chain and wherein said compartment is defined by the crankcase of said internal combustion engine.

7. The lubricating means according to claim 6 wherein said second passageway means define the only passageway connecting said reservoir with said cutting chain and wherein said valve means is the only valve means in said second passageway means.

8. The lubricating means according to claim 3 wherein:
   a. said bore is defined by a cylindrical subassembly having a cylindrical wall with a port therein communicating with said bore and defining the outlet of the latter, which cylindrical wall includes a pair of annular ribs on the exterior thereof, one on each side of said port; and
   b. said chain saw including frame means with an annular opening in sealing engagement with said ribs thereby defining an annular chamber communicating with said port, said frame means also including a passageway communicating said chamber with said cutting chain.

9. The lubricating means according to claim 8 wherein said cylindrical subassembly includes a formation which cooperates with a surface of said frame means to define at least a portion of said first passageway means.

10. The lubricating means according to claim 9 wherein a duckbill valve is mounted in said first passageway means for permitting fluid flow in one direction only from said crankcase to said reservoir.

* * * * *

UNITED STATES PATENT OFFICE
CERTIFICATE OF CORRECTION

Patent No. 3,776,369    Dated Dec. 4, 1973

Inventor(s) Frank C. Schrack and Arthur Lee

It is certified that error appears in the above-identified patent and that said Letters Patent are hereby corrected as shown below:

In the Abstract, line 2, after "in" insert
-- communication with the crankcase of such
engine for --.

Signed and sealed this 25th day of June 1974.

(SEAL)
Attest:

EDWARD M. FLETCHER, JR.
Attesting Officer

C. MARSHALL DANN
Commissioner of Patents